(12) United States Patent
Padberg et al.

(10) Patent No.: US 7,134,723 B2
(45) Date of Patent: Nov. 14, 2006

(54) VEHICLE SEAT ASSEMBLY

(75) Inventors: Klaus Padberg, Stuttgart (DE); Frank Lewetzky, Eppingen (DE); Carsten Ossang, Ettlingen (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 40 days.

(21) Appl. No.: 10/969,879

(22) Filed: Oct. 22, 2004

(65) Prior Publication Data

US 2005/0088026 A1   Apr. 28, 2005

(30) Foreign Application Priority Data

Oct. 25, 2003  (DE) ................................ 103 49 911

(51) Int. Cl.
   *B60N 2/00* (2006.01)
(52) U.S. Cl. ................ 297/341; 297/378.1; 296/65.09
(58) Field of Classification Search ................ 297/341, 297/378.12, 317, 318; 296/65.09
   See application file for complete search history.

(56) References Cited

U.S. PATENT DOCUMENTS

| | | | | |
|---|---|---|---|---|
| 4,957,321 A | * | 9/1990 | Martin et al. ............ | 296/65.09 |
| 5,454,624 A | * | 10/1995 | Anglade et al. ....... | 297/354.13 |
| 5,588,707 A | * | 12/1996 | Bolsworth et al. ..... | 297/378.12 |
| 5,904,404 A | * | 5/1999 | McCulloch et al. ... | 297/378.12 |
| 5,941,602 A | * | 8/1999 | Sturt et al. .................. | 297/340 |
| 6,089,641 A | * | 7/2000 | Mattarella et al. ............ | 296/64 |
| 6,152,533 A | * | 11/2000 | Smuk .......................... | 297/341 |
| 6,629,730 B1 | | 10/2003 | Makosa | |
| 6,688,696 B1 | * | 2/2004 | Brush et al. .............. | 297/378.1 |
| 6,749,247 B1 | * | 6/2004 | Mack et al. ............. | 296/65.09 |
| 6,817,670 B1 | * | 11/2004 | Macey .................... | 297/378.1 |
| 2002/0060487 A1 | | 5/2002 | Makosa | |

FOREIGN PATENT DOCUMENTS

| | | |
|---|---|---|
| DE | 29 47 813 | 10/1987 |
| DE | 198 41 363 | 4/2000 |
| DE | 100 47 743 | 4/2002 |
| DE | 100 57 660 | 4/2002 |
| DE | 101 23 776 | 11/2002 |

* cited by examiner

*Primary Examiner*—Peter M. Cuomo
*Assistant Examiner*—Sarah B. McPartlin
(74) *Attorney, Agent, or Firm*—Crowell & Moring LLP

(57) ABSTRACT

A rear vehicle seat having a seat part and a backrest is provided. The vehicle seat has a control device in connection with an adjusting device which have the purpose of implementing that, during a folding of the rear seat backrest, the seat part is displaced forward in the driving direction and lowered, and the backrest is then part of a loading surface which is constructed at the same level as the remaining loading surface of the vehicle.

9 Claims, 3 Drawing Sheets

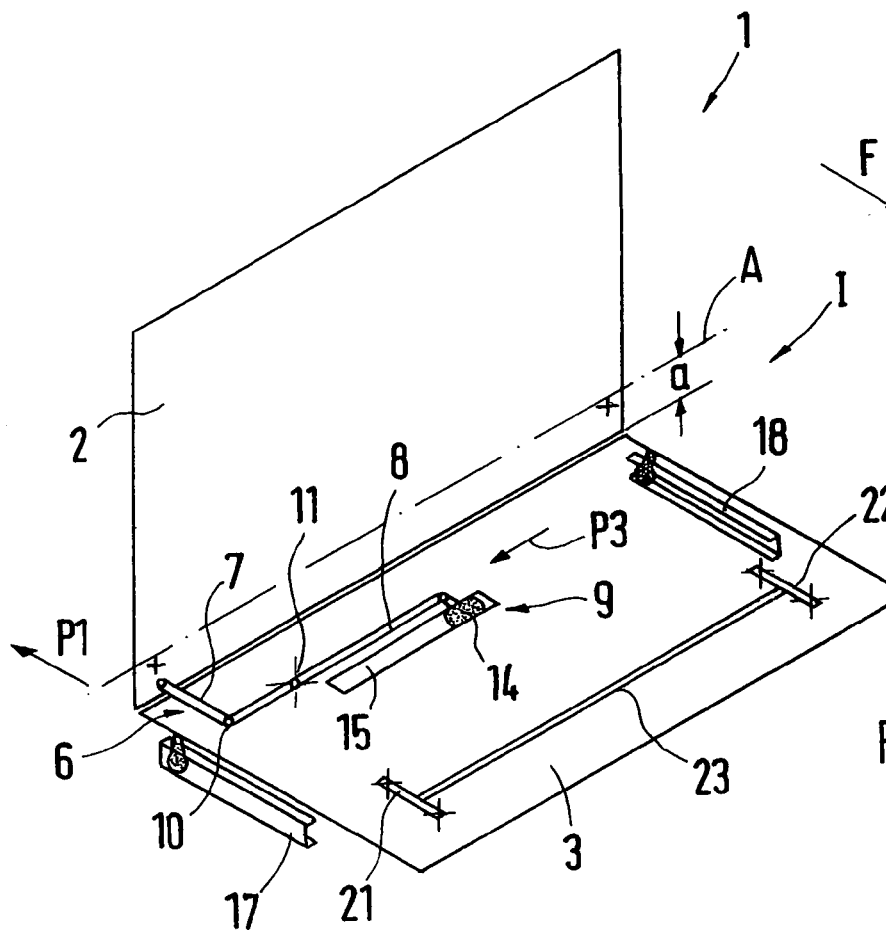
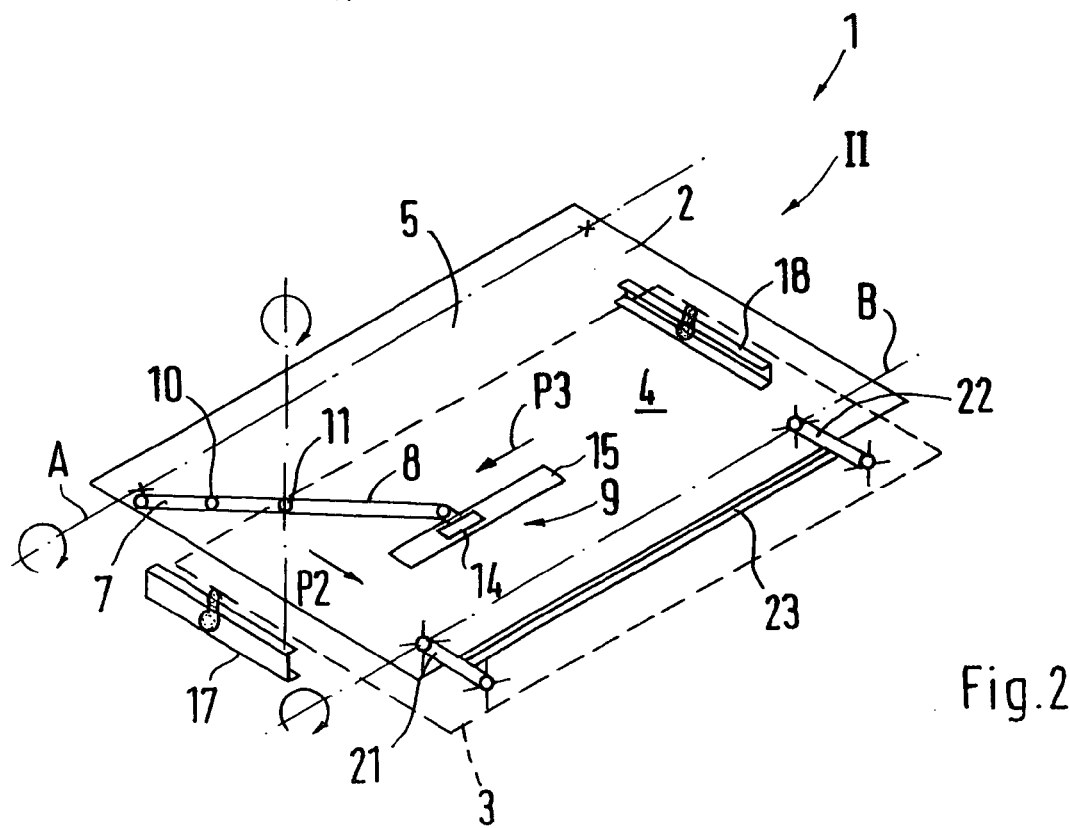

VEHICLE SEAT ASSEMBLY

BACKGROUND AND SUMMARY OF THE INVENTION

This application claims the priority of German Application No. 103 49 911.3-16 filed Oct. 25, 2003, the disclosure of which is expressly incorporated by reference herein.

The invention relates to a vehicle rear seat assembly having a seat part and a swivellable backrest which can be selectively deposited on the seat part in a storage position.

From German Patent Document DE 101 23 776 A1, a vehicle seat is know which has folding kinematics and in which case the seat comprises a seat part and a backrest part which can be folded down onto this seat part and, when the seat is changed from the usage position into its folded-together non-usage position, the seat part can be folded forward and downward by means of a linkage arranged on both sides of the seat and disposed in the seat console.

It is an object of the invention to provide an improved vehicle seat of the above-mentioned type which, while it is easy to handle, can be adjusted from a seat position into a folded-down depositing position and in which case, in this depositing position, an additional loading surface can be obtained in the vehicle.

According to the invention, this object is achieved by providing a rear seat for a motor vehicle including a seat part and a swivellable seat backrest, the seat backrest being adjustable from an upright seat position into a deposited depositing position on a top side of the seat part, wherein at least one control device is arranged between the backrest and the seat part, which control device comprises a first control lever which is connected with the backrest and is hinged to a second control lever which engages with the seat part by way of an adjusting device.

Other advantageous features and characteristics of preferred embodiments of the invention are described herein in the claims.

An important advantage achieved by means of certain preferred embodiments of the invention relates to the fact that, by folding the backrest onto the seat part of a rear seat bench system, an additional loading surface is created in a simple manner on the rearward side of the backrest, which loading surface is constructed approximately at the same level as the remaining loading surface of the vehicle. This is achieved in that at least one control device is arranged between the backrest and the seat part, which control device comprises a first control lever which is connected with the backrest and is hinged to a second control lever which engages with the seat part by way of an adjusting device.

According to certain preferred embodiments of the present invention, so that the seat part can be adjusted in the direction of the driving direction of the vehicle during a folding of the rear set backrest, it is provided that the second control lever comprises two control arms and is stationarily held in a swivel bearing, and a sliding block of the adjusting device is provided at its one free end, and a connecting joint to the first control lever is provided on its facing-away other free end. Furthermore, according to certain preferred embodiments of the present invention, it is provided that the seat part has a guide link as an adjusting device on the underside, in which guide link the sliding block of the second control lever of the adjusting device is displaceably arranged such that, in the depositing position, the seat part can assume a pushed-forward position. Instead of the link, according to certain preferred embodiments of the present invention, the second control lever according to the invention can also be connected with a driving element which engages in a corresponding guide rail.

For achieving a displacing movement of the seat part in the driving direction, according to certain preferred embodiments of the present invention, the first control arm is connected at a distance below the swiveling axis with the seat backrest such that, by means of the first control arm, a pulling movement is carried out against the driving direction, and the sliding block on the connected second control lever causes a pressing movement in the driving direction. Preferably, at least one control device is arranged between the backrest and the seat part, the first control lever extending n the longitudinal direction of the vehicle, and the second control lever extending in the transverse direction of vehicle in the seat position. As a result, a simple control device is created which requires little space, and an adjusting device is created which comprises few components and is easy to mount.

According to certain preferred embodiments of the present invention, the seat part is adjustably by way of rollers or sliding devices arranged in stationary guide rails and, viewed in the driving direction, swiveling levers are arranged on the forward side or in the forward area of the seat part on the underside of the seat part, which swiveling levers, during the forward-sliding, lower the seat part to such an extent that an approximately plane, additional loading surface is obtained with respect to the existing loading surface of the vehicle.

According to certain preferred embodiments of the present invention, these swiveling levers are mutually connected in a spaced manner by way of a crossbar and, by means of one end are in each case swivellably about an axis linked to the seat underframe or to the vehicle body, and the upright free ends of the swiveling levers, which face away, are held on the seat part. As a result, it is achieved that, when the backrest is folded into the driving direction, the seat part can be continuously lowered when being pushed forward.

According to certain preferred embodiments of the present invention, for achieving a simplified pushing-back into the seat position, a spring element is provided in an applied manner on the swiveling lever or in the swiveling axis of the backrest, which spring element, according to the invention, is arranged on at least one of the swiveling levers and has an initial tension against the lowering position of the seat part.

According to certain preferred embodiments of the present invention, for folding the backrest locked in the seat position, an unlocking handle of the backrest is operated and the backrest is folded forward by way of the latter, so that the backrest can be swiveled by means of the unlocking handle about the swiveling axis during adjusting movements of the first and second control lever of the control device into the depositing position onto the seat part, in which case, by way of the second control lever, the seat part can be displaced in the driving direction and can be adjusted into the lowered depositing position by means of the swiveling lever. As a result of this folding of the backrest, a subsequent movement of the seat part is triggered by way of the control levers, which also takes place when the backrest is folded back.

Other objects, advantages and novel features of the present invention will become apparent from the following detailed description of the invention when considered in conjunction with the accompanying drawings.

BRIEF DESCRIPTION OF THE DRAWINGS

FIG. 1 is a basic diagram of a vehicle seat with an schematically illustrated control device and adjusting device in the case of a vehicle seat in an upright seat position, constructed according to a preferred embodiment of the present invention;

FIG. 2 is a basic diagram of a vehicle seat with a schematically illustrated control device and adjusting device of FIG. 1 in the case of a vehicle seat in a folded-down depositing position;

DETAILED DESCRIPTION OF THE DRAWINGS

Figure 3:
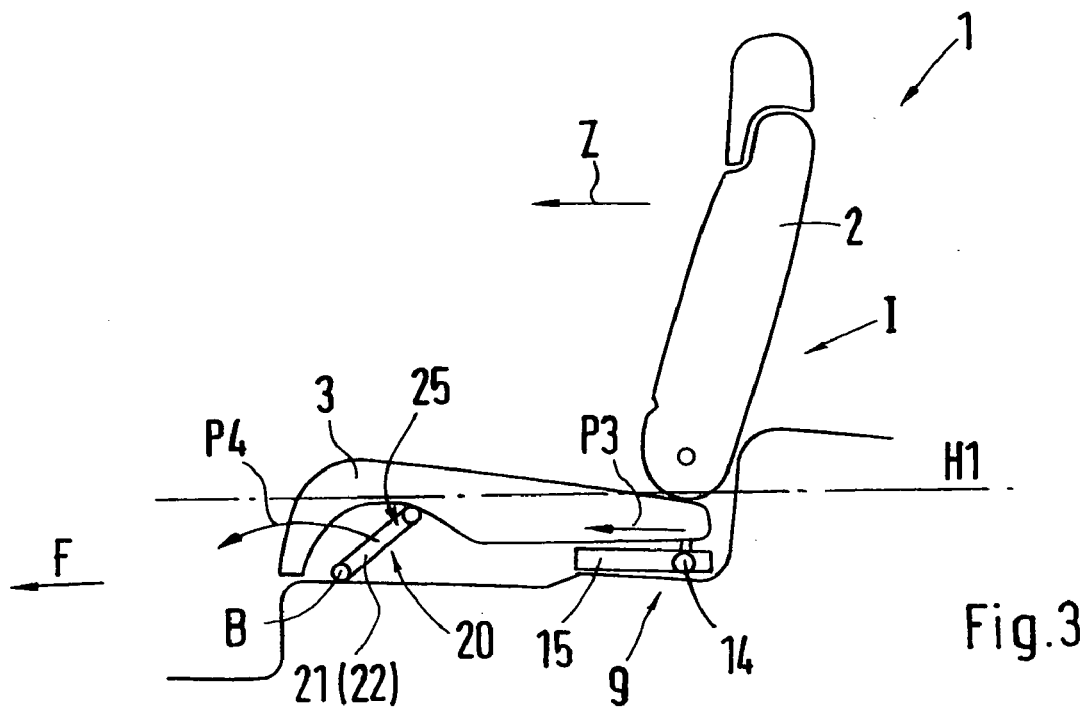
FIG. 3 is a lateral view of a vehicle seat with a schematically illustrated adjusting device according to FIG. 1, shown in the upright seat position.
Figure 4:
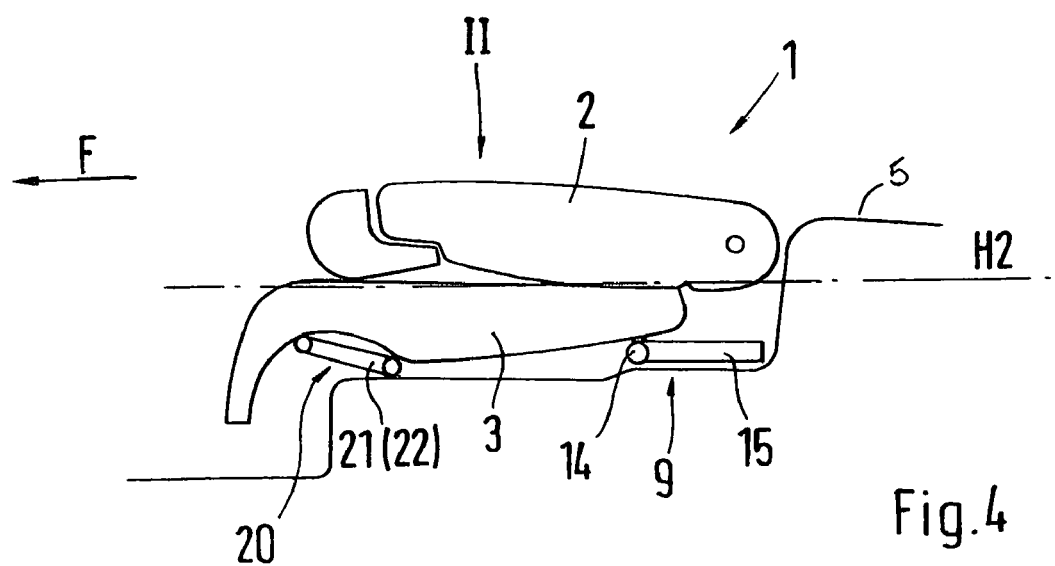
FIG. 4 is a lateral view of a vehicle seat according to FIG. 3, with a schematically illustrated adjusting device in the folded down depositing position.
Figure 5:
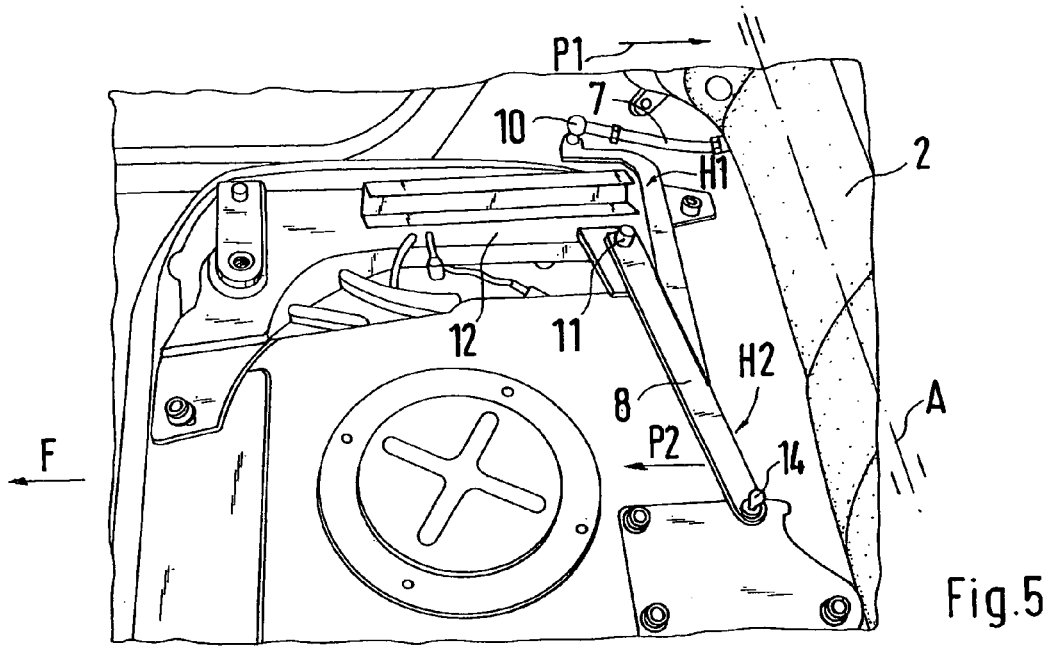
FIG. 5 is a diagrammatic representation of the control device with a partially illustrated adjusting device of the vehicle seat of FIGS. 1–4.
Figure 6:
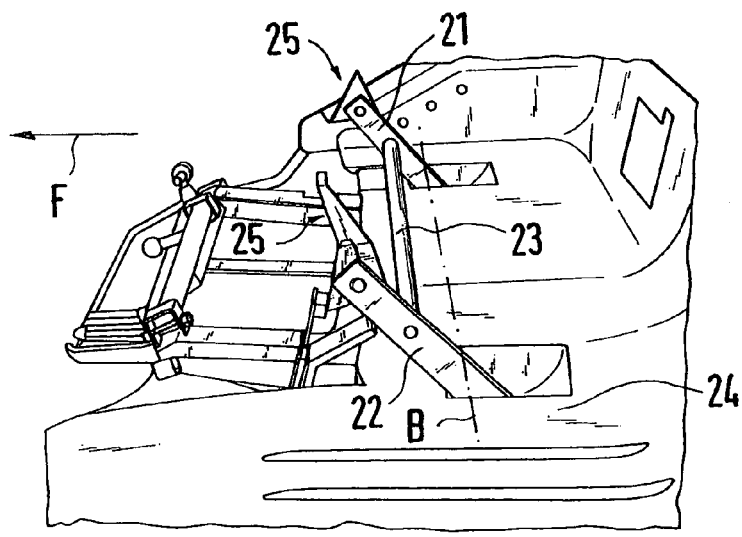
FIG. 6 is a schematic representation of the swiveling levers of the seat part of the vehicle seat of FIGS. 1–5.

The rear seat 1 of a motor vehicle comprises essentially a rear seat backrest 2, which is swivellable about a swiveling axis A linked to the vehicle side, as well as a seat part 3 corresponding to the rear seat 1. For achieving a continuous loading surface, the backrest 2 can be folded onto the seat part 3, so that the rear-side surface 4 of the backrest 2 forms a part of a loading surface 5 of the vehicle. As illustrated in greater detail in FIGS. 1 to 4, the seat is shown in a seat position I in FIGS. 1 and 3 and in a depositing or stowage position II in FIGS. 2 and 4.

The backrest 2 is connected with the seat part 3 by way of at least one control device 6, which comprises a first control lever 7 connected with the seat backrest 2 and a second control lever 8 connected with the control lever 7, the second control lever 8 being in an operative connection with the seat part 3 by way of an adjusting device 9.

The first control lever 7 of the device 6 is connected with the second control lever 8 by means of a hinge joint 10, which second control lever 8 is swivellably disposed by way of a stationary pivot bearing 11 on the vehicle body or on the seat underframe 12, which results in a lever arm H1 and a second lever arm H2.

The adjusting device 9 comprises a sliding block 14 arranged at the free end of the lever arm H2 of the control lever 8, which sliding block 14 is arranged to be displaceable in a slotted link 15 or guide link of the seat part 3. This slotted link 15 may extend in the transverse direction of the vehicle or may be arranged to extend diagonally.

The seat part 3 is displaceably guided in the longitudinal direction of the vehicle in stationary and mutually spaced rails 17, 18 on the vehicle floor. In the forward area of the seat part 3, a lowering device 20 is provided which comprises two swiveling levers 21, 22, which are mutually connected by means of a crossbar 23. The swiveling levers 21, 22 are swivellable about the axis B linked to the vehicle body 24 or to the seat underframe and, by means of their facing-away free ends 25, are connected with the seat part 3, which is illustrated in detail in FIGS. 3 and 7.

When the backrest 2 is folded forward about the swiveling axis A in the direction of the arrow Z, which corresponds to the driving direction F, the first control lever 7 moves into the direction of the arrow P1 and pulls the lever arm H1 of control lever 8 along, in which case the second lever arm H2 moves the control lever 8 about the bearing 11 in the direction of the arrow P2, and the sliding block 14 moves in the slotted link 15 of the adjusting device 9 in the direction of the arrow P3, and the seat part 3 moves in the driving direction F as a result of the pressing movement of the sliding block 14.

As a result of this restrictedly controlled displacing movement of the seat part 3 in the direction of the arrow P3, the swiveling levers 21, 22 are swiveled about the swiveling axis B while taking along the seat part 3 in the driving direction F toward the front in the direction of the arrow P4. As a result, the seat part 3 can be lowered from its seat position I at the level H1 and, after the folding, the backrest 2 takes up the depositing position II at the level H2, which is illustrated in detail in FIGS. 2 and 4.

Figure 7:
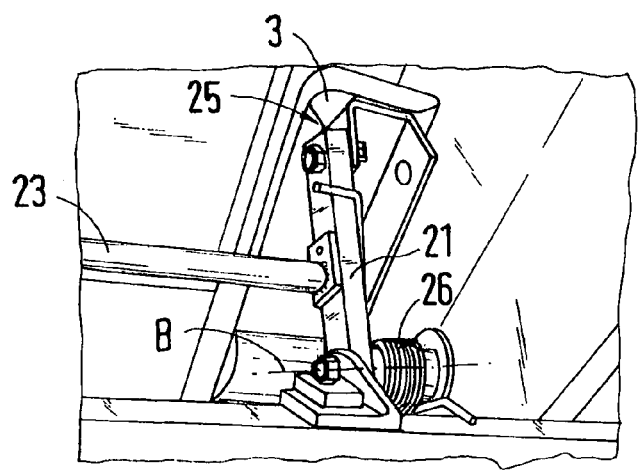
FIG. 7 is a diagrammatic representation of the spring element on the swiveling lever of the vehicle seat of FIGS. 1–6.

For adjusting the seat part 3 back in a simplified manner after a folding-back of the seat backrest 2, a spring element 25 is provided on at least one of the swiveling levers 21 or in the swiveling axis of the backrest, which spring element 25 seeks to swivel the swiveling lever in a supporting manner back into its seat position I, which is illustrated in detail in FIG. 7.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Vehicle seat for a motor vehicle including a seat part and a swivellable seat backrest, the seat backrest being adjustable from an upright seat position into a deposited depositing position on a top side of the seat part, wherein at least one control device is arranged between the backrest and the seat part, which control device comprises a first control lever which is connected with the backrest and is hinged to a second control lever which engages with the seat part by way of an adjusting device, the second control lever has two mutually fixed lever arms and is held in a stationary pivot bearing and, at one of the second control lever's ends, is operatively connected with a sliding block of the adjusting device and, at the second control lever's other end, is operatively connected by a hinge joint with the first control lever and, on one hand, the seat part is adjustably moveable on a vehicle driving direction by rollers or sliding blocks arranged in stationary guide rails of a vehicle body and, on the other hand, is lowerable and raisable with respect to the vehicle body by way of swiveling levers of a lowering device.

2. Vehicle seat according to claim 1, wherein the seat part has a guide link or slotted link as an adjusting device on an underside thereof, in which guide link or slotted link the sliding block of the second control lever of the adjusting device is arranged in a manner displaceable in a direction such that, in the depositing position, the seat part takes up a pushed-forward position.

3. Vehicle seat according to claim 2, wherein the first control lever is connected with the seat backrest at a distance below a swiveling axis such that the first control lever carries out a pulling movement in a direction against a vehicle longitudinal direction, and the sliding block on the second control lever carries out a pressing movement in a vehicle driving direction.

4. Vehicle seat according to claim 2, wherein, on one hand, the seat part is adjustably moveable in a vehicle driving direction by rollers or sliding blocks arranged in stationary guide rails of a vehicle body and, on the other hand, is lowerable and raisable with respect to the vehicle body by way of swiveling levers of a lowering device.

5. Vehicle seat according to claim 1, wherein the first control lever is connected with the seat backrest at a distance below a swiveling axis such that the first control lever carries out a pulling movement in a direction against a vehicle forward direction, and the sliding block on the second control lever carries out a pressing movement in the vehicle forward direction.

6. Vehicle seat according to claim 5, wherein, on one hand, the seat part is adjustably moveable in a vehicle driving direction by rollers or sliding blocks arranged in stationary guide rails of the vehicle body and, on the other hand, is lowerable and raisable with respect to the vehicle body by way of swiveling levers of a lowering device.

7. Vehicle seat for a motor vehicle including a seat part and a swivellable seat backrest, the seat backrest being adjustable from an upright seat position into a deposited depositing position on a top side of the seat part, wherein at least one control device is arranged between the backrest and the seat part, which control device comprises a first control lever which is connected with the backrest and is hinged to a second control lever which engages with the seat part by way of an adjusting device, wherein, on one hand, the seat part is adjustably moveable in a vehicle longitudinal direction by way of rollers or sliding blocks arranged in stationary guide rails of a vehicle body and, on the other hand, is lowerable and raisable with respect to the vehicle body by way of swiveling levers of a lowering device, and the swiveling levers are mutually connected in a spaced manner by way of a crossbar and, via one end thereof, are adjustably movable about a swiveling axis linked to a seat underframe, and opposite ends of the swiveling levers are held at the seat part.

8. A vehicle assembly, comprising a rear seat including a seat part and a seat backrest, said seat backrest being adjustably movable between an upright seating position and a stowage position on a top side of the seat part, a stowage compartment having a stowage floor surface extending to a rear side of the seat backrest when in its seating position, and a control device arranged between the seat part and seat backrest to control movements between the seating position and the stowage position, said control device comprising a first control lever connected with the backrest and hinged to a second control lever which engages with the seat part by way of an adjusting device, wherein the second control lever has two mutually fixed lever arms and is held in a stationary pivot bearing and, at one of the second control lever's ends, has a sliding block of the adjusting device and, at the second control lever's other end, has a hinge joint with the first control lever, the seat part has a guide link or slotted link as an adjusting device on the underside, in which guide link or slotted link the sliding block of the second control lever of the adjusting device is arranged in a manner displaceable in a direction such that, in the stowage position, the seat part takes up a pushed-forward position, the first control lever is connected with the seat backrest at a distance below a swiveling axis such that the first control lever carries out a pulling movement in a direction against a vehicle forward direction, and the sliding block on the connected second control lever carries out a pressing movement in a vehicle forward direction, and on the one hand, the seat part is adjustably moveable in a vehicle driving direction by means of rollers or sliding blocks arranged in stationary guide rails of the vehicle body and, on the other hand, is lowerable and raisable with respect to the vehicle body by way of swiveling levers of a lowering device.

9. An assembly according to claim 8, wherein the backrest is adapted to be swivellable by an unlocking handle about a swiveling axis during adjusting movements of the first and second control levers of the control device into the stowage position onto the seat part being displaceable in a vehicle longitudinal direction and being adjustable into the lowered stowage position by swiveling levers.

* * * * *